(12) United States Patent
Sexton et al.

(10) Patent No.: US 6,401,185 B1
(45) Date of Patent: Jun. 4, 2002

(54) METHOD AND APPARATUS FOR ACCESSING PAGED OBJECTS USING A FAST DIVISION TECHNIQUE

(75) Inventors: Harlan Sexton; David Unietis, both of Menlo Park, CA (US)

(73) Assignee: Oracle Corp., Redwood Shores, CA (US)

(*) Notice: Subject to any disclaimer, the term of this patent is extended or adjusted under 35 U.S.C. 154(b) by 0 days.

(21) Appl. No.: 09/320,578

(22) Filed: May 27, 1999

(51) Int. Cl.[7] .............................................. G06F 12/06
(52) U.S. Cl. ........................ 711/209; 711/220; 711/219; 711/203; 711/200
(58) Field of Search ................................. 711/112, 200, 711/203, 209, 219, 220; 707/521, 525; 708/209, 103, 503, 504, 650; 710/49

(56) References Cited

U.S. PATENT DOCUMENTS

| | | | |
|---|---|---|---|
| 4,722,047 A | * 1/1988 | Chan et al. ................. | 711/202 |
| 5,682,499 A | * 10/1997 | Bakke et al. ................ | 711/112 |
| 5,684,986 A | * 11/1997 | Moertl et al. ................ | 707/101 |
| 5,991,297 A | * 11/1999 | Palnati et al. ................ | 370/389 |
| 6,014,733 A | * 1/2000 | Bennett ....................... | 711/216 |
| 6,216,201 B1 | * 4/2001 | Ado et al. ................... | 711/112 |

* cited by examiner

*Primary Examiner*—B. James Peikari
(74) *Attorney, Agent, or Firm*—Ditthavong & Carlson, P.C.

(57) ABSTRACT

A fast division technique is provided to calculate the address of a slot in a paged object, when the slot is located on a different page than the beginning of the object. The fast division technique employs arithmetical-logical operations of shifting and masking, that are faster than most hardware implementations of integer division and modulus, respectively. In one aspect, the use of these operations is facilitated by requiring the page size and the size of the page header to be a power of two.

24 Claims, 5 Drawing Sheets

METHOD AND APPARATUS FOR ACCESSING PAGED OBJECTS USING A FAST DIVISION TECHNIQUE

RELATED APPLICATIONS

The present application is related to the commonly assigned, U.S. patent application Ser. No. 09/248,297 entitled "A Paged Memory Management System Within a Run-Time Environment," filed on Feb. 11, 1999 by Harlan Sexton et al., the contents of which are hereby incorporated by reference.

FIELD OF THE INVENTION

The present invention relates to computer systems and more particularly to paged memory management for a run-time execution environment.

BACKGROUND OF THE INVENTION

A dynamic run-time environment for a language such as JAVA™ is responsible for managing memory for objects that are created and destroyed during the execution of a program. An object may be defined as a logically contiguous atomic unit of typed state of the program. Objects thus encapsulate data in particular regions of memory that are allocated and deallocated for the program by the dynamic run-time environment.

Differences between server environments make machine independence very difficult to achieve for portable run-time environments. For example, some operating systems, in practice if not by design, limit the guaranteed size of contiguous virtual memory to a "page," typically about two or four kilobytes in size, and prior paged memory systems simply failed when sufficient large blocks of virtual memory was not available. This page-size limitation is particularly common for allocating objects in shared memory for access by different processes.

If the run-time environment is adapted to allow objects to be allocated in a plurality of non-contiguous pages, however, then the overhead in calculating which parts of an object belong to which pages becomes a significant factor in system performance. For example, one way to determine which pages belong to an object is to maintain an ancillary data structure called a page map that lists a set of pages in a logical order. If a part of object at a given displacement cannot fit on a page based on the location of the beginning of the object in the page and the displacement into the object, the page map is consulted to determine the next logical page or pages for the part of the object that cannot fit on the first page.

When an object in a paged memory management system crosses a page boundary (referred herein to as a "paged object"), slot-access operations for the object need additional support from the run-time environment. A slot-access operation gets or sets a value of a "slot" in a object (i.e. a field or instance variable) at a known displacement from the virtual address of the beginning of the object. If the object is contiguous or fits on a single page, then the address of the slot can be determined simply by adding the displacement to the beginning of the object. For paged objects, on the other hand, this addition results in an invalid address when the displacement crosses one more page boundaries, because the page boundary may occur between any of the slots and vary from instance to instance.

Accordingly, a slot-access operation of a machine pointer to a paged object requires checking to see if adding the displacement crosses one or more page boundaries. When there is such an "excess displacement," the logical page number and page offset for the displacement address is calculated, and the address of the beginning of the page is fetched from the page map and dereferenced with the page offset. This calculation is complicated when a certain amount of each page is reserved in a page header, for example, by the operating system or the run-time environment to store administrative information about the page. Conventionally, the page header is kept as small as practical because the page header represents overhead that is not available for storing objects of the program.

In accordance with one approach, the logical page number and the page offset are calculated by computing the integer quotient and remainder of the excess displacement with the effective size of the page. For example, if the page size is 4096 ($2^{12}$) and the page header size is 120, then the effective page size is 4096−120=3976. For an excess displacement of 5000, the calculated integer quotient is 5000%3976=1, and the calculated remainder is 5000% 3976=1024. Thus, the address of the slot is 1024 bytes past the header of the first page after the next page.

Micro-benchmarks on the Pentium™ processor have determined that more than half of the time required to compute the slot address is spent performing the integer division and remainder calculations. Because slot-access calculations consume a significant portion of the run-time environment's time budget for all operations (e.g. about 5%), overall system performance of the run-time environment can be improved by improving the performance of the slot-access computation.

SUMMARY OF THE INVENTION

Therefore, there is a need for improving the performance of a run-time environment operating with a paged memory management system. More specifically, a need exists for a fast method of computing the slot address of a paged object, particularly when the logical displacement of the slot results in an address on another page. There exists a need for avoiding integer division and remainder operations by the processor in slot-access calculations.

These and other needs are addressed by the present invention, in which the integer division and remainder operations are replaced by a fast division technique that counts the number page boundaries crossed by the logical displacement and adding back into the remainder the size of the page header for each page boundary crossings. Accordingly, it is possible to employ arithmetical-logical operations of shifting and masking, which are faster than most hardware implementations of integer division and modulus, respectively. In another aspect, the use of these operations is facilitated by requiring the page size and the size of the page header to be a power of two.

Accordingly, one aspect of the invention pertains to a computer-implemented method and a computer-readable medium bearing instructions for accessing a slot of an object allocated on more than one page, when the slot is logically located at an excess displacement from an end of the first page upon which the object is allocated. Each page has the same page size and a page header of the same size. In accordance with this methodology, the number of page boundaries crossed by the excess displacement is calculated, e.g. by shifting, to identify which one of the pages the slot is located upon. A page offset for an address of the slot is calculated by adding a remainder of the excess displacement modulo the page size, e.g. by masking, and the number of crossed page boundaries in units of the common page header size. Thus, the slot is accessed at the page offset from the beginning of the identified page.

Another aspect of the invention relates to a computer-implemented and a computer-readable medium bearing instructions for managing memory in a paged memory system. In this system, $2^M$ bytes of memory is allocated for each page, and $2^K$ is allocated for each page header by padding where necessary. Consequently, a slot of an object, when the slot is located at an excess displacement from the end of the first page for the object, is accessed by calculating a quotient and remainder of the excess displacement modulo $2^M-2^K$. The quotient indicates the page containing the slot and the remainder indicates the logical offset on the page for the slot.

In one embodiment, the quotient and remainder of the excess displacement modulo $2^M-2^K$ is calculated by shifting the excess displacement by K bits to produce a first partial quotient; masking the excess displacement to retain the K least significant bits thereof to produce a first partial remainder; calculating a second partial quotient and a second partial remainder of the first partial quotient by $2^{M-K}-1$; shifting the second partial remainder by K bits and adding a result thereof and the first partial remainder to produce the remainder; and establishing the second partial quotient as the quotient.

In another embodiment, the quotient and remainder of the excess displacement modulo $2^M-2^K$ is calculated by comparing the excess displacement and $2^M-2^K$; if the excess displacement is less than $2^M-2^K$, then establishing zero as the quotient and the excess displacement as the remainder; otherwise by establishing the excess displacement as a current value; calculating a first value as a quotient of the current value divided by $2^M$; calculating a second value as a remainder of the current value modulo $2^M$; adding the second value and a product of the first value and $2^K$ to produce the current value; and establishing the current value as the remainder.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and article for memory management in a run-time environment are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
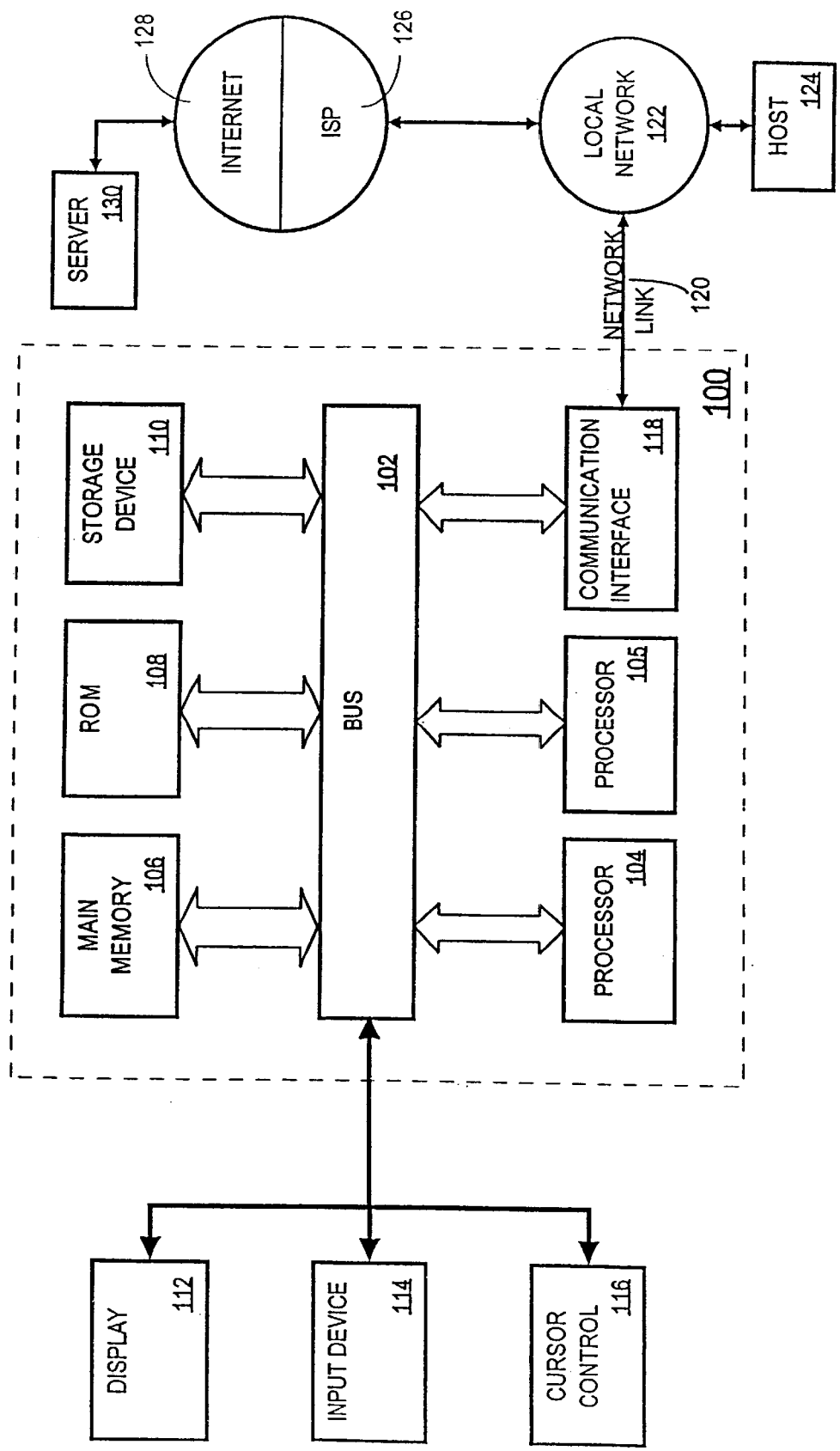
FIG. 1 is a diagram of a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 106.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 110 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Paged Memory System

Figure 2:
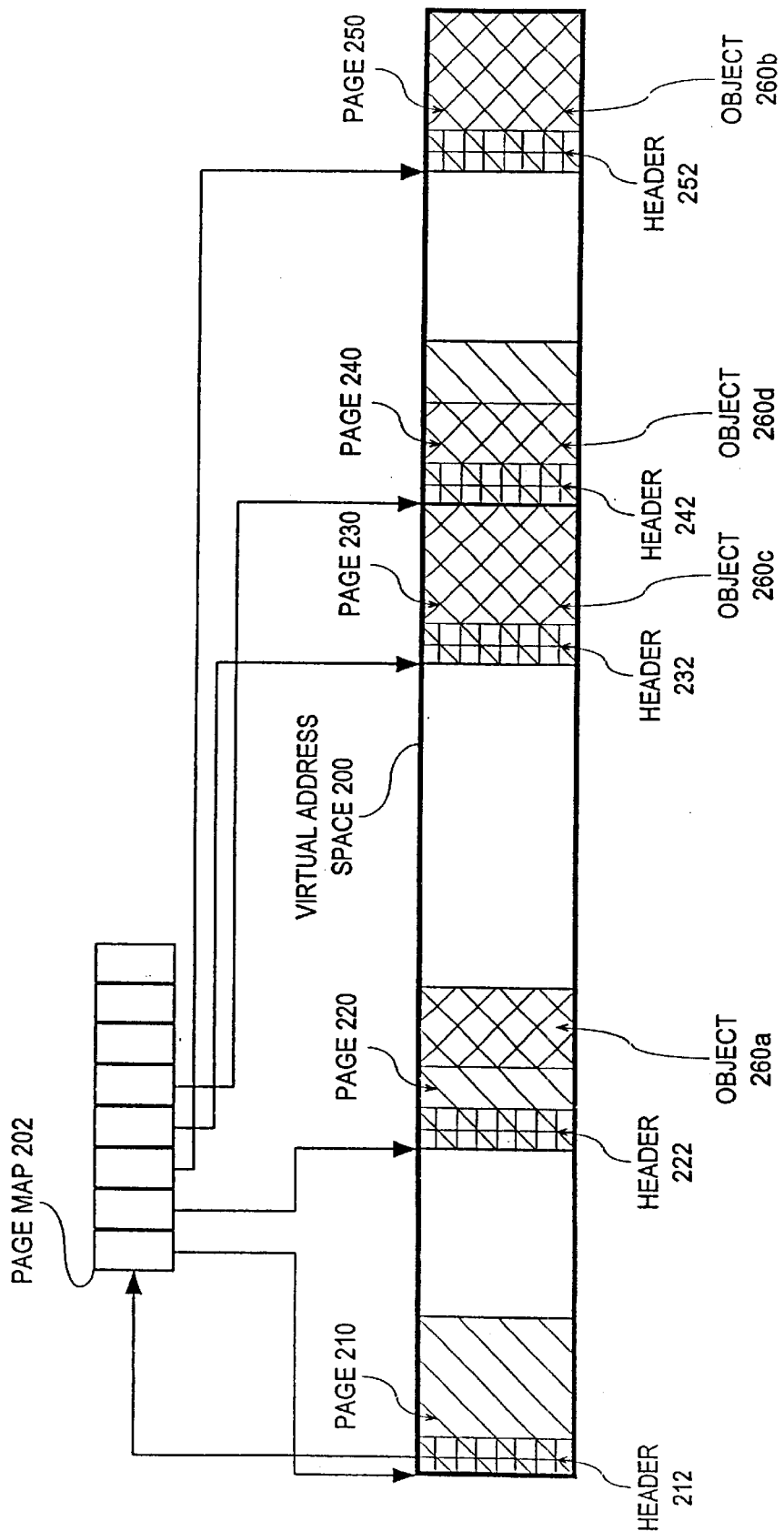
FIG. 2 is a schematic diagram of a paged memory management architecture in accordance with one embodiment of the present invention.

When the state of a program executing in a run-time environment is to be allocated in server environments in which the maximum size of a contiguous memory segment is severely constrained, it is useful to divide the program state into a plurality of fixed-size contiguous chunks of memory called "pages." A page is a moderately sized contiguous memory segment that is supported within the server environments, especially for shared memory. FIG. 2 depicts a portion of virtual address space 200 that includes a plurality of pages 210, 220, 230, 240, and 250. The page size is preferably compatible with those servers that severely restrict the size of contiguous memory segments. For example, the page size may be in the range of 256 B ($2^8$ bytes) to 64 kB ($2^{16}$ bytes), such as 4 kB ($2^{12}$ bytes) or 8 kB ($2^{13}$ bytes). For purposes of illustration, the following discussion will refer to 4 kB pages in an exemplary embodiment. The pages themselves are preferably aligned on 4 kB boundaries.

To access the various pages of the virtual memory, a page map is maintained to keep track of the pages. Each page is assigned a logical page number, which is used to index the page map to fetch the virtual address of the beginning of the page, called a page address. For example, a page map 202, which in one embodiment is stored in page #0 (210), contains entries storing page addresses of the pages of the virtual address space 200. The logical order of the pages in the page map 202 may be different from the physical order of the pages in the virtual address space 200. For example, the physical order of the pages is pages 210, 220, 230, 240, and 250, but the logical order of the pages as indicated by the page map 202 is 210, 220, 250, 230, and 240.

A certain amount of space, called a "page header," is reserved at the beginning of each page to store useful information for the memory management of the page, including the logical page number, the address of the page map, and the base address of the object memory (page address for page 0). For example, each of the pages 210, 220, 230, 240, and 250 contain a page header 212, 222, 232, 242, and 252. In contrast with conventional approaches, the size of the header is padded out to a power of two. For example, if normally the page header would be 120 bytes of information, the page header is padded with an extra 8 bytes to reserve of a total of 128 bytes, which is $2^7$. As explained hereinafter, this padding facilitates a fast division technique to be implemented for address calculation of slots within paged objects.

FIG. 2 also depicts a paged object that is too large to fit in any single page, and, in fact, is allocated on four pages 220, 230, 240, and 250 in four respective portions 260a, 260c, 260d, and 260e. The first portion 260a of the paged object is located at some address on page 220. The next portion 260b of the paged object consumes the entire usable memory of page 250, which is logically the next page after page 220 according to the page map 202. The third and fourth portions 260c and 260d of the paged are located on pages 230 and 240, respectively.

In one paged memory system, objects are composed of a series of 4-byte or 8-byte slots, logically ordered in an ascending sequence. Each slot is located at a logical displacement from the beginning of the object. In the virtual address space, each slot is located on one of the object's pages at a "page offset" from the beginning of the page. On the first page allocated for the object, the logical displacement of the slot is equal to the page offset of the slot minus the page offset of the beginning of the object. For example, if the beginning of object 260 is located at page offset 0x0800 (2048) and the page size is 4 kB (4096 bytes), then logical displacements in the range 0x0000 to 0x07FA correspond to page offsets in the range 0x0800 to 0x0FFA. Thus, for a slot on the first page 260a of an object, there is a straightforward numerical relationship between the logical displacement of the slot and the page offset of the slot.

For slots on subsequent pages, however, the relationship is more complicated, because the addresses of the slots are no longer contiguous. The pages themselves may not be contiguous, and each page includes a page header that is reserved for administrative information. For example, if the logical displacement of a slot of an object is large enough to extend 32 bytes past the end of the first page 260a, then the page offset of the slot is 32 bytes past the page header 252 of the next page 250. If the page header 252 is 128 bytes long, then the page offset of that slot is at 128+32=160 bytes from the beginning of page 250. Each time the logical displacement results in a page boundary being crossed, the logical page number is increased and the accumulated page offset is increased by the size of the page header.

Address Calculation

Accessing a slot in an object requires transforming the address of the object and the logical displacement of the slot into a virtual address. If the logical displacement is sufficiently small so that the slot is on the same page as the beginning of the object, then the physical address can be computed easily by pointer arithmetic.

Figure 3:
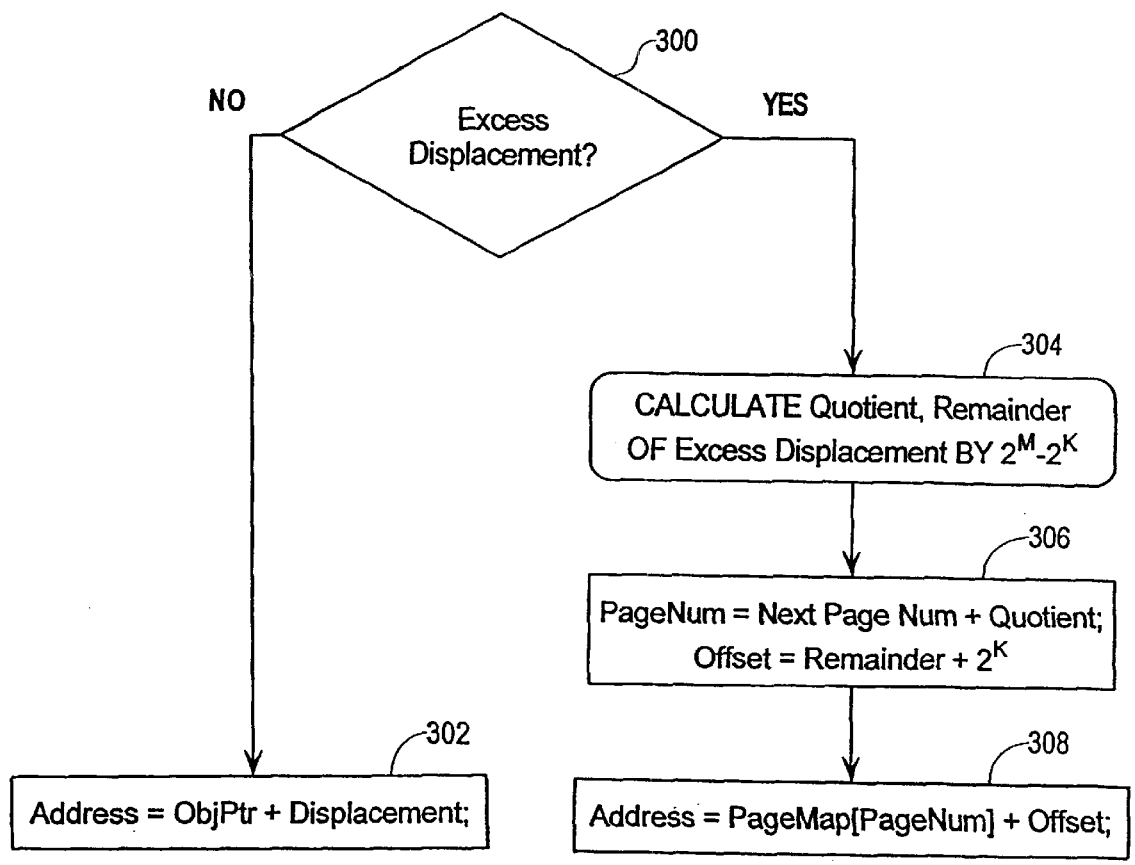
FIG. 3 is a flowchart illustrating the address calculation of a slot in a paged object in accordance with an embodiment.

Referring to FIG. 3, it is a flowchart illustrating steps performed in accessing a slot in an object. At step 300, it is determined whether there is excess displacement. In one embodiment, this step is performed by first testing to see if pointer arithmetic will work for the slot, and if not then calculating the excess displacement. When the page size is a power of 2, e.g. $2^M$, the following test can be used to quickly determine whether or not pointer arithmetic will work for an object referenced by ObjPtr: ((ObjPtr & ((1<<M)−1))+Displ)<(1<<M). If the test succeeds, then there is no excess displacement and execution therefore branches to step 302, where the physical address is calculated as the sum of the pointer to the object and the logical displacement.

On the other hand, when pointer arithmetic by itself will not work because the logical offset maps to a virtual address on another page, the transformation from the logical offset to the virtual address requires more calculations. Specifically, the excess displacement is first calculated as ((ObjPtr & ((1<<M)−1))+Displ)−(1<<M) and then execution branches to step 304.

At step 304, the quotient and remainder of the excess displacement is divided by the number of useable bytes per page. According to one embodiment, step 304 is performed using a fast division technique as explained hereinafter. If the page size is $2^M$ bytes and the page header is $2^K$, the number of usable bytes per page is $2^M–2^K$. At step 306, the logical page number of the slot is computed as the logical page number of the next page plus the quotient, and the page offset of the slot is calculated as the remainder plus the size of page header ($2^K$). At step 308, the address is calculated by indexing the page map 202 by the logical page number to fetch the page address and adding the page address to the page offset calculated in step 306.

For example, if a slot is 32 bytes past the end of the first page, then the quotient and remainder of 32 into 3968 ($2^{12}–2^7$) is 0 and 32, respectively. Thus, the logical page number of the slot is the same as the logical page number of the next page, and the offset is $32+2^7=160$ bytes from the address of the beginning of the page.

Fast Division Technique

One aspect of the present invention stems from the realization that calculating the quotient and remainder by a power of two can be efficiently implemented by shifting and masking ALU operations, respectively, that are much faster than most hardware implementations of integer division and modulus. Specifically, the quotient of a number divided by $2^K$ can be calculated by shifting the number K bits to the right. The remainder of a number modulo $2^K$ can be calculated by masking to retain the N least significant bits, for example, by an AND operation with the bit pattern $2^K–1$.

Figure 4:
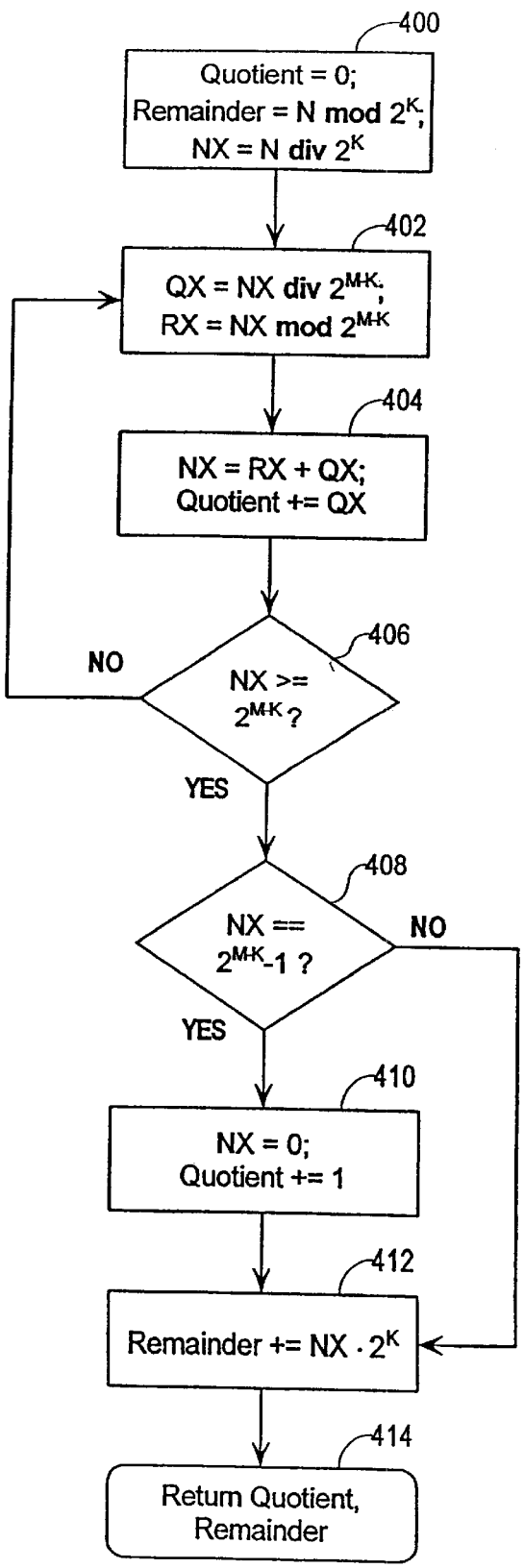
FIG. 4 is a flowchart showing a fast division technique of dividing an integer N by $2^M-2^K$ according to one embodiment.

FIG. 4 is a flowchart illustrating a fast division technique in accordance with one embodiment to calculate the quotient and remainder of an excess displacement N by $2^M–2^K$. This technique employs to two stages, based on the following equation:

$$N=(2^M-2^K)q+r=2^K[(2^{M-K}-1)q+r_1]+r_0, \qquad (1)$$

where $r=2^K r_1+r_0$. In the first stage, a first partial quotient, $NX=(2^{M-K}-)q+r_1$, and a first partial remainder, $r_0$, of the excess displacement N by $2^K$ is calculated. In the second stage, a second partial quotient, QX=q, and a second partial remainder, RX=$r_1$, of the first partial quotient NX by $2^{M-K}-1$ is calculated. The desired quotient q is then set to the second partial quotient q and the desired remainder is $r=2^K r_1+r_0$.

Accordingly, at step 400, the running quotient, "Quotient," is initialized to zero, and the desired remainder, "Remainder," is initialized to the first partial remainder $r_0$ by masking to retain the K least significant bits of the excess displacement N. The first partial quotient, NX=$(2^{M-K}-1)$q+ $r_1$, is calculated by shifting the excess displacement N by K bits to the right. For a working example where M=12 and K=7, performing step 400 with an excess displacement of 8080 results in a first partial remainder of Remainder=(8080 & $2^7-1$)=16 and a first partial quotient of NX=(8080>>7)= 63.

In a loop performed by steps 402, 404, and 406, the quotient and remainder of the first partial quotient NX by $2^{M-K}-1$ is calculated by calculating the quotient and remainder of the current value of NX by $2^{M-K}$ and adjusting the remainder by one part out of every $2^{M-K}$, until the first partial quotient is reduced to less than $2^{M-K}$. The one part out of every $2^{M-K}$ represents the portion of each extra page that is reserved for the header and is therefore not usable for storing the object. Thus, the accumulated quotient represents the number of page boundaries being crossed by the excess displacement.

Specifically, at step 402, the second partial quotient QX and the second partial remainder RX are calculated using the current value of NX as the dividend and $2^{M-K}$ as the divisor. In the working example, the second partial quotient QX is produced by shifting NX=63 by 5 (63>>5) to produce a value of 1, and the second partial remainder RX is produced by masking NX to retain the bottom 5 digits of NX as 63 & $2^5-1$=31.

At step 404, the running quotient "Quotient" is incremented by the second partial quotient QX, and the current value of NX is calculated as the second partial remainder RX plus the second partial quotient QX. In the working example, the running quotient "Quotient" is incremented by QX=1 to attain the value of 1, and the current value of NX is calculated to be 31+1=32.

At step 406, the current value of NX is compared with $2^{M-K}$ to determine if the current value of first partial quotient (NX) equals or exceeds the divisor $2^{M-K}$. If the current value of NX equals or exceeds the divisor $2^{M-K}$, then another iteration is needed and execution loops back to step 402. In the working example, the current value of NX is 32, which equals $2^{12-7}=2^5$=32. Therefore, execution loops back to steps 402, where the new QX=32>>5=1, and the new RX=32 & 31=0. Thus, in step 404, the desired Quotient is incremented by the new QX=1 to produce a value of 2, and the new current value of NX becomes 0+1=1. Accordingly, at step 406, since new current value of NX, 1, is less than 32, execution of the loop terminates and proceeds to step 408.

On the other hand, if the current value of first partial quotient (NX) is less than the divisor $2^{M-K}$, execution of the loop terminates and proceeds to step 408. In the working example, this event occurs on the second iteration of the loop. At step 408, the current value of NX is compared with the value $2^{M-K}-1$. This test will be true when the accumulated remainder in terms of $2^K$-byte sections would yield a page offset in the middle of the page header of the next logical page. In this case, execution proceeds to step 410, where the current value of NX is set to zero and the desired quotient "Quotient" is incremented by one. In the working example, the test of step 408 is not true, because the current value of NX is 1, not 31; however, this test would be true if the excess displacement was, for example, 3986. In either case, execution proceeds to step 412.

At step 412, the results of the second stage are processed to produce the desired quotient "Quotient" and the desired remainder "Remainder." More specifically, the desired "Quotient" is set to the second partial quotient, and the desired remainder "Remainder" is augmented by the current value of NX multiplied by $2^K$, since the current value of NX was calculated in units of $2^K$. In the working example, the desired quotient "Quotient" is set to 2, and the desired remainder "Remainder" is set to 16+1·$2^7$=144. Computing the product of the current value of NX and $2^K$ is preferably performed by shifting the current value of NX by K bits to the left. At step 414, the results, "Quotient" and "Remainder" are ready to be used in step 306 as explained hereinabove.

The following commented C/C++ code illustrates one possible implementation of a fast division technique in accordance with this embodiment of the present invention:

```
#define M 12          /* 2^M = Page size in bytes       */
#define K 7           /* 2^K = Page header size in bytes */
#define D (M-K)       /* 2^D = Page size in page headers */
#define M_MASK ((1 << M) - 1)
#define K_MASK ((1 << K) - 1)
#define D_MASK ((1 << D) - 1)
#define DIVISOR ((1 << M) - (1 << K))
unsigned int divrem2(unsigned int n,
    unsigned int *rem)
{
    if (n < DIVISOR) {
        *rem = n;
        return 0;
    } else {
        unsigned int q = 0;
        unsigned int r = n * K_MASK;
        n >>= K;
        /* Calculate DIVREM (2^D - 1): */
        do {
            unsigned int qx = n >> D;
            n = qx + (n & D_MASK);
            q += qx;
        } while (n > D_MASK);
        if (n == D_MASK) {
            n = 0;
            q++;
        }
        /* Adjust rem Mod (2^D - 1) into Bytes */
        *rem = (n << K) + r;
        return q;
    }
}
```

With the above-disclosed fast division technique, the total cost of the slot access calculation can be reduced to about 40% according to micro-benchmarks. Since in some instances of a paged memory management system, the slot-access calculation consumes up to 3–5% of the total time and possibly more with naive compilers, the performance improvement due to the above-disclosed fast division technique is substantial.

Another embodiment of the invention stems from the realization that the size of paged objects is not uniformly distributed. In fact, typical values for the logical displacements for desired slots tend to be at a logical addresses less than 64 KB away from the beginning of the page, and a significant amount of desired slots are on the next page. Therefore, it is desirable, for such memory management systems, to check first if the excess displacement can reach the next page.

Figure 5:
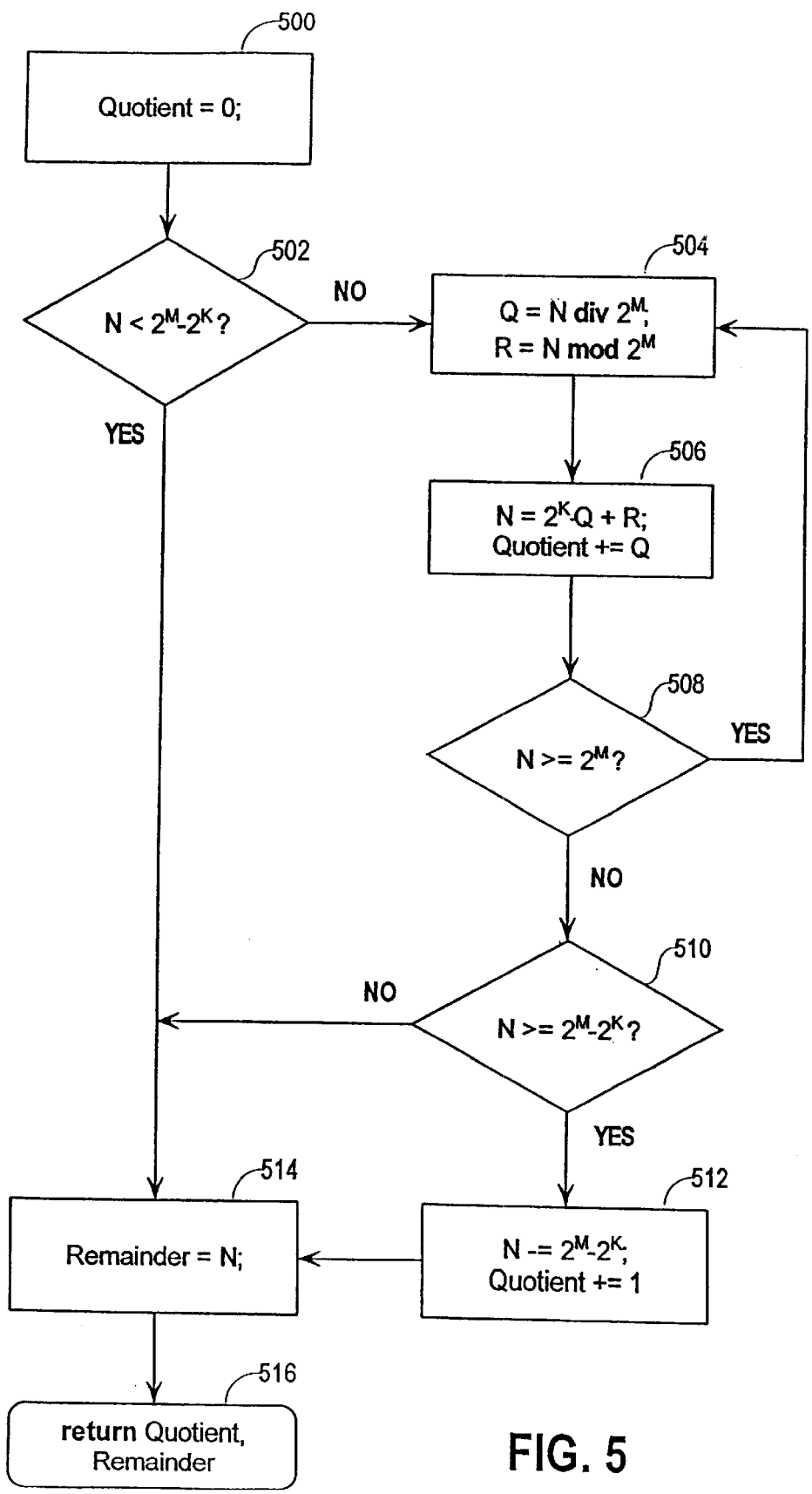
FIG. 5 is a flowchart showing a fast division technique of dividing an integer N by $2^M-2^K$ according to another embodiment.

FIG. 5 is a flowchart illustrating a fast division technique for another embodiment to calculate the quotient and remainder of an excess displacement N by $2^M-2^K$. This embodiment is illustrated by a working example with M=12, K=7, and an excess displacement of 8080. At step 500, the quotient is initialized to zero and the excess displacement N is first compared with $2^M-2^K$ in step 502. If the excess displacement N is indeed less than $2^M-2^K$, then execution proceeds to step 514 where the result Remainder is established to the excess remainder, for being returned with the quotient in step 516. In the working example, however, 8080 is not less than 3968.

Therefore, step 504 is performed, calculating a current quotient $Q=N$ div $2^M$, preferably by a right arithmetic shift of M bits, to count the number of page boundaries crossed by the excess displacement and calculation a current remainder $R=N$ mod $2^M$, preferably by masking to retain the M least significant bits. In the working example, current quotient Q is calculated to be 8080 div 4096=1 and current remainder R is calculated to be 3984. At step 506, the size of the page header for each crossing is added to the current remainder R to update the current excess displacement N and the running Quotient for the result is incremented the current quotient Q. In the working example, the current excess displacement N becomes 3984+128=4112.

At step 508, the current excess displacement N is compared against the full page size $2^M$ to determine if adding the bytes for crossing the page boundaries has resulted in more page boundaries being crossed. If so, execution branches back to steps 504 and 506, which are performed until the condition in step 508 is satisfied. In the working example, since 4112>4096, another iteration through the loop is performed, resulting in the current quotient Q=1, the current remainder R=16, and the current excess displacement $N=1\cdot2^7+16=144$, and the running Quotient being incremented to 2.

At step 510, the current excess displacement N is compared with the value $2^M-2^K$. This test will be true when the current excess displacement N would yield a page offset in the middle of the page header of the next logical page. In this case, execution proceeds to step 512, where the current excess displacement N is decremented by $2^M-2^K$ and the running quotient "Quotient" is incremented by one. In the working example, the test of step 510 is not true, because the current excess displacement N is 144, which is not greater than or equal to 3968.

Finally, execution proceeds to steps 514 and 516, where the resultant Remainder is set to the current excess displacement N and returned with the running Quotient. In the working example, a Quotient=2 and a Remainder=144 are returned.

Benchmarks indicate that the second embodiment about 6.8% faster than the first embodiment, including loop and function call overhead, if the excess remainder N is uniformly distributed in the range from 0 to 16383. However, both embodiments are at least twice faster the hardware integer division and remainder operations.

The following commented C/C++ code illustrates one possible implementation of a fast division technique in accordance with this embodiment of the present invention:

```
#define M 12        /* 2^M = Page size in bytes       */
#define K 7         /* 2^K = Page header size in bytes */
#define M_MASK ((1 << M) - 1)
#define K_MASK ((1 << K) - 1)
#define DIVISOR ((1 << M) - (1 << K))
/* Code to calculate n DIVREM (2^M - 2^K) */
```

```
unsigned int divrem3(unsigned int n,
    unsigned int *rem)
{
    unsigned int Quotient = 0;
    if (n < DIVISOR) {
        *rem = n;
        return 0;
    } else {
        unsigned int q = 0;
        do {
            unsigned int qx = n >> M;
            n = (qx << K) + (n & M_MASK);
            q += qx;
        } while (n > M_MASK);
        if (n >= DIVISOR) {
            q++;
            n -= DIVISOR;
        }
        *rem = n;
        return q;
    }
}
```

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of accessing a slot of an object allocated on a plurality of pages, wherein the slot is logically located at an excess displacement from an end of a page upon which a beginning of the object is allocated and each of the pages has a same page size and includes a page header having a same page header size, said method comprising the computer-implemented steps of:

calculating a number of page boundaries crossed by the excess displacement to determine which one of the pages the slot is located upon;

calculating a page offset for an address of the slot by adding a remainder of the excess displacement modulo the page size and the number of crossed page boundaries in units of the page header size; and accessing the slot at the page offset from a beginning of the one of the pages.

2. The method of claim 1, wherein calculating a number of page boundaries crossed by the excess displacement includes the step of shifting the excess displacement.

3. The method of claim 1, further comprising the step of masking the excess displacement to calculate the remainder.

4. A method of managing memory in a paged memory system, said method comprising the computer-implemented steps of:

allocating memory for a plurality of pages, each of the pages comprising $2^M$ bytes;

padding respective page headers of the pages so that $2^K$ bytes are allocated for each of the pages; and accessing a slot of an object allocated on a plurality of the pages, wherein the slot is located at an excess displacement from an end of a page upon which a beginning of the object is allocated, by calculating a quotient and remainder of the excess displacement modulo $2^M-2^K$, said quotient indicating a page containing the slot and said remainder indicating a logical offset on the page containing the slot.

5. The method of claim 4, wherein the step of calculating a quotient and a remainder of the excess displacement modulo $2^M-2^K$ includes the steps of:

shifting the excess displacement by K bits to produce a first partial quotient;

masking the excess displacement to retain the K least significant bits thereof to produce a first partial remainder;

calculating a second partial quotient and a second partial remainder of the first partial quotient by $2^{M-K}-1$;

shifting the second partial remainder by K bits and adding a result thereof and the first partial remainder to produce the remainder; and establishing the second partial quotient as the quotient.

6. The method of claim 5, wherein the step of calculating a second partial quotient and a second partial remainder of the first partial quotient by $2^{M-K}-1$ includes the steps of:

(a) establishing the first partial quotient as a current value;

(b) initializing the second partial quotient to zero;

(c) shifting the current value by M−K bits to produce a first value;

(d) masking to retain the M−K least significant bits of the current value to produce a second value;

(e) incrementing the second partial quotient by the first value;

(f) adding the first value and the second value to produce the current value; and (g) establishing the current value as the second partial remainder.

7. The method of claim 6, wherein the step of calculating a second partial quotient and a second partial remainder of the first partial quotient by $2^{M-K}-1$ further includes the steps of:

comparing the current value with $2^{M-K}-1$;

if the current value equals $2^{M-K}-1$, then setting the current value to zero and incrementing the second partial quotient by one.

8. The method of claim 6, wherein the step of calculating a second partial quotient and a second partial remainder of the first partial quotient by $2^{M-K}-1$ further includes the step of performing steps (c), (d), (e), and (f) until the current value is less than $2^{M-K}$.

9. The method of claim 4, wherein the step of calculating a quotient and a remainder of the excess displacement modulo $2^M-2^K$ includes the steps of:

comparing the excess displacement and $2^M-2^K$; and if the excess displacement is less than $2^M-2^K$, then establishing zero as the quotient and the excess displacement as the remainder.

10. The method of claim 9, wherein the step of calculating a quotient and a remainder of the excess displacement modulo $2^M-2^K$ further includes the steps of:

(a) establishing the excess displacement as a current value;

(b) calculating a first value as a quotient of the current value divided by $2^M$;

(c) calculating a second value as a remainder of the current value modulo $2^M$;

(d) adding the second value and a product of the first value and $2^K$ to produce the current value; and (e) establishing the current value as the remainder.

11. The method of claim 10, wherein the step of calculating a quotient and a remainder of the excess displacement modulo $2^M-2^K$ further includes the steps of:

comparing the current value with $2^M-2^K$; and if the current value is greater than or equal to $2^M-2^K$, then subtracting $2^M-2^K$ from the current value.

12. The method of claim 10, wherein the step of calculating a quotient and a remainder of the excess displacement modulo $2^M-2^K$ further includes the step of performing steps (b), (c), and (d) until the current value is less than $2^M$.

13. A computer-readable medium bearing instructions for accessing a slot of an object allocated on a plurality of pages, wherein the slot is logically located at an excess displacement from an end of a page upon which a beginning of the object is allocated and each of the pages has a same page size and includes a page header having a same page header size, said instructions arranged, when executed by one or more processors, to cause the one or more processors to perform the steps of:

calculating a number of page boundaries crossed by the excess displacement to determine which one of the pages the slot is located upon;

calculating a page offset for an address of the slot by adding a remainder of the excess displacement modulo the page size and the number of crossed page boundaries in units of the page header size; and accessing the slot at the page offset from a beginning of the one of the pages.

14. The computer-readable medium of claim 13, wherein calculating a number of page boundaries crossed by the excess displacement includes the step of shifting the excess displacement.

15. The method of claim 13, wherein said instructions are further arranged to cause the one or more processors to perform the step of masking the excess displacement to calculate the remainder.

16. A computer-readable medium bearing instructions for managing memory in a paged memory system, said instructions arranged, when executed by one or more processors, to cause the one or more processors to perform the steps of:

allocating memory for a plurality of pages, each of the pages comprising $2^M$ bytes;

padding respective page headers of the pages so that $2^K$ bytes are allocated for each of the pages; and accessing a slot of an object allocated on a plurality of the pages, wherein the slot is located at an excess displacement from an end of a page upon which a beginning of the object is allocated, by calculating a quotient and remainder of the excess displacement modulo $2^M-2^K$, said quotient indicating a page containing the slot and said remainder indicating a logical offset on the page containing the slot.

17. The computer-readable medium of claim 16, wherein the step of calculating a quotient and a remainder of the excess displacement modulo $2^M-2^K$ includes the steps of:

shifting the excess displacement by K bits to produce a first partial quotient;

masking the excess displacement to retain the K least significant bits thereof to produce a first partial remainder;

calculating a second partial quotient and a second partial remainder of the first partial quotient by $2^{M-K}-1$;

shifting the second partial remainder by K bits and adding a result thereof and the first partial remainder to produce the remainder; and establishing the second partial quotient as the quotient.

18. The computer-readable medium of claim 17, wherein the step of calculating a second partial quotient and a second partial remainder of the first partial quotient by $2^{M-K}-1$ includes the steps of:

(a) establishing the first partial quotient as a current value;

(b) initializing the second partial quotient to zero;

(c) shifting the current value by M–K bits to produce a first value;

(d) masking to retain the M–K least significant bits of the current value to produce a second value;

(e) incrementing the second partial quotient by the first value;

(f) adding the first value and the second value to produce the current value; and (g) establishing the current value as the second partial remainder.

19. The computer-readable medium of claim 18, wherein the step of calculating a second partial quotient and a second partial remainder of the first partial quotient by $2^{M-K}-1$ further includes the steps of:

comparing the current value with $2^{M-K}-1$;

if the current value equals $2^{M-K}-1$, then setting the current value to zero and incrementing the second partial quotient by one.

20. The computer-readable medium of claim 18, wherein the step of calculating a second partial quotient and a second partial remainder of the first partial quotient by $2^{M-K}-1$ further includes the step of performing steps (c), (d), (e), and (f) until the current value is less than $2^{M-K}$.

21. The computer-readable medium of claim 16, wherein the step of calculating a quotient and a remainder of the excess displacement modulo $2^M-2^K$ includes the steps of:

comparing the excess displacement and $2^M-2^K$; and if the excess displacement is less than $2^M-2^K$, then establishing zero as the quotient and the excess displacement as the remainder.

22. The computer-readable medium of claim 21, wherein the step of calculating a quotient and a remainder of the excess displacement modulo $2^M-2^K$ further includes the steps of:

(a) establishing the excess displacement as a current value;

(b) calculating a first value as a quotient of the current value divided by $2^M$;

(c) calculating a second value as a remainder of the current value modulo $2^M$;

(d) adding the second value and a product of the first value and $2^K$ to produce the current value; and (e) establishing the current value as the remainder.

23. The computer-readable medium of claim 22, wherein the step of calculating a quotient and a remainder of the excess displacement modulo $2^M-2^K$ further includes the steps of:

comparing the current value with $2^M-2^K$; and if the current value is greater than or equal to $2^M-2^K$, then subtracting $2^M-2^K$ from the current value.

24. The computer-readable medium of claim 22, wherein the step of calculating a quotient and a remainder of the excess displacement modulo $2^M-2^K$ further includes the step of performing steps (b), (c), and (d) until the current value is less than $2^M$.

* * * * *